Patented Nov. 21, 1933

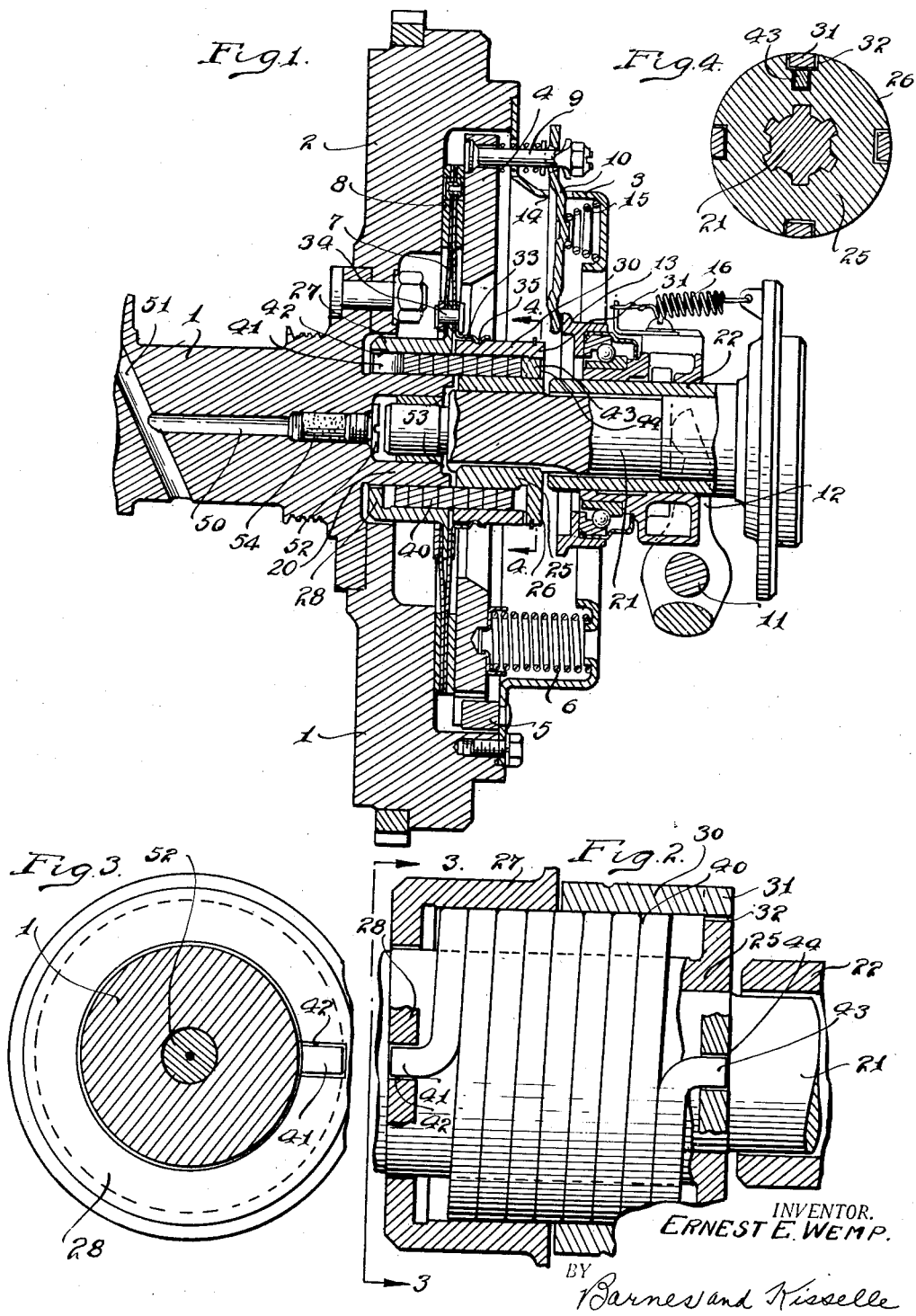

1,935,684

UNITED STATES PATENT OFFICE 1,935,684

CLUTCH

Ernest E. Wemp, Detroit, Mich.

Application November 5, 1931. Serial No. 573,113

7 Claims. (Cl. 192—35)

This invention has to do with transmission of power, and is particularly concerned with power transmission in an automotive vehicle. More particularly, the invention is concerned with a clutch which may be engaged and disengaged at will so that the same is effective and ineffective, respectively, for transmitting power.

There are a number of objects of the invention, among which are some that are directly related to automotive vehicles, and the use of the improved construction of this invention in automotive vehicles. The invention is applicable, however, to other arts where clutching devices are employed in the transmission of power.

The general practice at the present time in automotive vehicles, is the use of a friction clutch wherein driving and driven members are packed together for transmitting driving power. It will be obvious that large and powerful automotive vehicles require clutches of higher torque capacity than small and lighter vehicles of less power. Due to this, largely, more physical effort is required to operate the clutch of a large, powerful vehicle than a smaller one, and this fact runs contrary to the usual expectations of the buyer and user of a large powerful machine, which is usually expensive, as ease of operation is expected in such vehicles.

Among the objects of the invention is the provision of a clutch capable of handling high torque, yet one which possesses the desirable quality of ease of operation. Another object of the invention is the provision of a clutch of high torque capacity wherein the overall diameter may be relatively small. With other factors such as coefficient of friction constant, torque capacity increases with diameter, and clutches of required torque capacity for powerful engines have heretofore needed a diameter relatively great as compared to clutches of lower torque capacity embodying the same type of clutch structure. Small diameter is advantageous particularly in view of the fact that the tendency in design of the automotive vehicles at the present time is to construct them low to the ground, and where a relatively large diameter for the clutch is needed, difficulties are found in providing sufficient road clearance at the clutch housing. Accordingly, the present invention affords a clutch of high torque capacity yet requiring only a small diameter; thus facilitating lowness in the vehicle.

More specifically, the invention contemplates the provision of a clutch wherein there is more than one clutching agency. In accordance with the invention one of these agencies may be a friction clutch of any usual construction, preferably of relatively low torque capacity as compared to the torque capacity required for transmitting the power, and another clutching agency which may comprise a clutch device of such a nature as to be energized into clutching relation by the action of the first agency or friction clutch and which produces relatively high torque capacity. An operator need only exert sufficient force to control the relatively low torque capacity friction clutch, and by this, control the second agency.

A further object of the invention is the provision of such a clutch wherein the requisite slipping of the clutch in starting the vehicle into motion is provided. The second mentioned clutching agency having high torque capacity may in itself not afford this clutch slipping action. But in accordance with the invention the arrangement of the parts is preferably such that this slippage may be provided by the friction clutch during which time the second mentioned clutching agency is ineffective. Due to the fact that a low torque capacity friction clutch may be used, the invention lends itself to the utilization of the friction clutch of a type having desirable characteristics but which would otherwise not provide sufficient torque capacity. Still further, the invention contemplates a clutch which may be of a construction such as to substantially prevent communication of engine vibrations to driven parts and to the driving axle and frame of the vehicle, and which may, in a measure, dampen out the engine vibrations. Other objects will appear as the detailed description progresses in connection with the accompanying drawing:

Fig. 1 is a sectional view taken through a clutch construction made in accordance with the invention.

Fig. 2 is a view taken through the central portions of the clutch illustrating some parts in section.

Fig. 3 is a sectional view in the direction of the arrows 3—3 of Fig. 2.

Fig. 4 is a section taken on line 4—4 of Fig. 1.

The accompanying drawing shows a construction designed for use in an automotive vehicle, and the invention will be described in relation to such construction. The end of a crank shaft of an internal combustion engine is shown at 1 and mounted thereon is a flywheel 2. A friction clutch may be associated with the flywheel and comprises such parts as a cover plate 3 and a pressure ring 4 which may be driven as by means of studs 5 interconnecting the cover plate and pressure ring. The pressure ring is urged in an axial direction as by means of packing springs 6 backed up by the cover plate so that the driven member of the friction clutch as illustrated at 7, is packed between the pressure ring and a surface of the flywheel, for which purpose the driven member may have facing material 8. The friction clutch may be released by moving the pressure plate against the action of the packing springs for which purpose studs 9 connect to the pressure ring and to operating levers at 10. A control shaft is shown at 11 having one or more operating arms 12 which, when rocked counterclockwise, as by means of a suitable foot lever, shifts a releasing structure or block axially from right to left, this block having a member 13 which engages the inner ends of the levers to rock them clockwise, as Fig. 1 is viewed, around the point 14 as a fulcrum for withdrawing the pressure plate. Antirattling springs for each lever, as shown at 15, may be employed. The axially shiftable block structure may be held retracted as by means of a spring 16. So much of the clutch structure just described may be of more or less standard form and is subject to structural variations, although as will be pointed out later, the invention lends itself to the utilization of an advantageous form of friction clutch.

The engine crankshaft has a rearward extension 20 with an exterior surface which may be gripped by a clutching agency. A driven shaft is shown at 21 which is journaled, as shown, at its forward end in the projecting end of the crank shaft 1 and which extends into the central housing 22 which may be carried by a transmission case (not shown). It is on this central housing 22 that the shifting block 13 may be mounted.

Mounted upon the driven shaft 21, as by means of a spline connection as shown, is a sleeve 25 provided with a flange 26. This sleeve has an outside surface which may be gripped by a clutching agency. The driven disk 7 has a hub in the form of a sleeve 27 which carries an inwardly extending flange 28. Except for clutching means presently to be described, the sleeve 27 is free to rotate relative to the engine crank shaft, and also relative to the driven shaft and its sleeve 25. The sleeve 27 cooperates to form a recess between it and the extension 20 of the crank shaft. An opposing recess is provided by a sleeve 30 placed over the sleeve 25, and sleeve 25 and sleeve 30 may be associated with each other to prevent relative rotation for the purpose of which the sleeve 30 may have projecting teeth 31 which are located in recesses 32 (Fig. 4) of the flange 26 of sleeve 25. In order to maintain the sleeves 27 and 30 in proper cooperating relation a sheet metal ring 33 may be carried by rivets 34 which connect the driven disk to the flange of the sleeve 27, and the ring 33 may have a portion depressed into a circumferential notch in the sleeve 30, as shown at 35.

The extension 20 of the crank shaft and sleeve 27 form a circumferential recess, and the sleeve 25 and the sleeve 30 form an opposing circumferential recess. Disposed in these recesses is a coil spring 40. One end of the coil spring is disposed in driving relation with sleeve 27, for which purpose one end, as shown at 41, may be turned outwardly and located in a notch 42 in the flange 28 of sleeve 27 (see Fig. 2). The other end of the spring is associated in driving relation with the sleeve 25 for which purpose its other end, as at 43, may be turned outwardly and located in the recess 44 in the flange 26.

In normal inoperative position of the parts the coil spring 40 has an inside diameter, such that its convolutions are spaced from the exterior surfaces of the extension 20, and preferably also the sleeve 25, so as to not engage them. In the operation of the clutch let it be assumed that we start from this normal inoperative position; the operator permits engagement of the friction clutch with more or less ease, or gradually permitting the pressure plate 4 to shift axially thus packing the driven disk between the two driving parts, to wit: the pressure plate and the opposing surface of the flywheel. When rotary movement is imparted to the driven disk and the sleeve 27, the tendency is to drive the driven shaft 21 and its sleeve 25 through the coil spring inasmuch as the ends of the spring are tied to the two sleeves. When the transmitted torque is sufficient the coil spring 40 is wound up, so to speak, so that its convolutions contract around and engage the exterior surface of the extension 20 and sleeve 25. Thus the convolutions grip and frictionally engage these driving and driven parts. It will not here be necessary to go into detail as regards the efficiency of a coil spring clutch of this type as it is known that this type of clutch has a highly efficient frictional engagement. The gripping effect depends upon the coefficient of friction, the length of the circular arc in contact with the spring, and the radius of the frictionally engaged surface. These factors may be selected as desired. The frictional engagement afforded by such a spring substantially squares itself with each additional convolution.

So it will be observed that the friction clutch comprising friction faces 8 and other associated parts serve to energize the coil spring into clutching engagement, and as the vehicle is operated along the highway the coil spring is effective for taking substantially all the transmitted power. It will have been noted that it was above stated that upon starting the vehicle by engagement of the friction clutch, there was a tendency to drive the driven shaft through the coil spring. By this we mean that the coil spring tends to drive the driven shaft prior to its having been contracted or energized into frictional engagement with the driving and driven parts associated therewith. The preferred arrangement is such that the coil spring be of sufficient strength to impart considerable driving action or in other words, transmit considerable torque prior to being energized into frictional clutching engagement. This is important as it facilitates starting the vehicle from a position of rest. A certain amount of clutch slippage is highly desirable when so starting the vehicle, else it will be observed that the engine may be killed or suddenly brought to a stop. By thus providing a spring capable of transmitting considerable torque, slippage of the clutch as between the driven disk and its driving parts, afford this desirable slipping action when getting the vehicle under way from a standing start. Ofttimes an automotive vehicle is operated under very low torque as is the case when the vehicle is being maneuvered for parking purposes or being shifted every relatively short distance, and at such times the torque may not be sufficient to contract the spring, and thus the advantages of the clutch slip is obtained. However, in normal highway operation the transmitted torque contracts the spring and it frictionally engages its associated surfaces, and the efficiency of a coil spring of the type utilized is such that there is no slippage during operation of the vehicle over the highway at normal or high speeds.

When in operation of the vehicle the torque through the clutch is reversed, as by means of the operator closing or partially closing the throttle of the engine and allowing the vehicle to drive the engine, the spring 40 expands and thus is ineffective for transmitting the torque directly from the driven shaft to the engine crank shaft. In other words, when this occurs, the driven shaft 21 tends to drive the engine through the friction clutch. The sleeves 27 and 30 serve as limiting sleeves for limiting the expansion of the spring and the reverse driving torque expands the spring into clutching engagement with the sleeves.

Thus it will be seen that a friction clutch of low torque capacity may be used in vehicles really requiring a clutch of high torque capacity. As a specific example, it may be pointed out that a friction clutch having a torque capacity of about 30% or 35% of that required in a vehicle may be used, as the reverse torque existing when the vehicle is driving the engine does not exceed about 30% of the engine driving torque. This makes it possible to hold the overall diameter of the friction clutch to a minimum thus facilitating lowness in vehicle construction. It permits of utilizing a single disk clutch which is desirable for a number of reasons, but in which the requisite torque capacity is difficult to obtain without utilizing a clutch having an undesirably great diameter. However, it is to be understood that a friction clutch having two or more disks may be utilized in this invention and in conjunction with the secondary clutching agency. Inasmuch as the spring 40 transmits driving effort, the flexing of the spring serves the purpose of preventing the transmission of vibrations in the engine, to a large extent, to the driven shaft thence back into the driving axle of the vehicle and vehicle frame, and at the same time serves to some extent for dampening out the vibrations in the engine since an oscillatory motion of vibration in the crank shaft tends to flex the spring in alternating unwinding and winding actions.

In a coil spring clutch of this type it is desirable that the parts be lubricated, and for this purpose the crank shaft may be drilled to form an oil passageway 50 which may communicate into the usual drilled passageway 51 for the rearmost bearing of the crank shaft. A metering plug 52 may be used having an aperture of such determined size as to pass the desired amount of oil out into the clutch, and the oil may pass to the spring and its associated engaging surfaces through circumferential space 53 between extension 20 and sleeve 25. A mass of material 54 may be used to strain the oil. This circumferential space may be disposed substantially centrally of the spring. As there will be a flow of oil into the clutch during engine operation suitable means may be provided for returning this oil to the crank case of the engine, but this may be done in any desired or conventional manner and there is no necessity of disclosing just how this may be done insofar as the present invention is concerned.

I claim:

1. In a clutch, the combination of a driving member, a driven member, said members having axially aligned parts providing exterior gripping surfaces, a driven disk, means for packing the driven disk into frictional engagement with the driving member, a coil spring surrounding the said axially aligned parts, one end of the spring being connected to the driven disk and the other end of the spring being connected to the driven member, said spring being adapted to contract around said axially aligned parts upon transmission of torque thereto by the driven disk whereby to establish driving connection between the driving member and driven member, said spring being adapted to expand when the torque is from the driven member to the driving member, and means rotatable with the driven disk for limiting the expansion of the spring.

2. In a clutch, the combination of a driving member and a driven member having axially aligned parts providing exterior gripping surfaces, a coil spring surrounding said surfaces, a driven disk, means for packing the driven disk into frictional engagement with the driving member, a hub for the driven disk in the form of a sleeve over part of said spring, means connecting one end of the spring with said hub, means connecting the other end of the spring with said driven member, said last named means being in the form of a sleeve located over part of said spring.

3. In a clutch, the combination of a driving member and a driven member having axially aligned parts providing exterior gripping surfaces, a coil spring located over said parts and arranged to normally permit relative rotation between said parts, means operatively associating one end of the spring with the driven member, the other end of the spring being normally disassociated with said driving member, a friction clutch including a driven disk, means for packing the same into clutching engagement with the driving member, means connecting the driven disk with the end of the spring which overlies said part on the driving member, and a rotary sleeve over the coil spring for limiting its expansion.

4. In combination, a flywheel of an engine, a driven disk, a driving pressure plate shiftable for packing the driven disk between the flywheel and plate for engaging the same, a shaft to which the flywheel is connected, said shaft having an axially extending part, a driven shaft having a part in axial alignment with the said extending part of the shaft and of substantially the same diameter, a coil spring situated over said parts and normally out of engagement with said parts, sleeve means over the spring, the end of the spring situated over the extending part of the shaft being connected to the sleeve means, the end of the spring situated over the driven shaft being connected in driving relation to the driven shaft, and means connecting the driven disk to said sleeve means.

5. In a clutch, the combination of a drive shaft, a driven shaft, clutch driving members, a driven clutch disk, means for actuating one of the driving members whereby the drive members may engage and release the driven disk, said shafts having juxtapositioned parts in axial alignment and of similar outside diameters, a coil spring located over said parts and normally out of engagement therewith, a sleeve over the portion of the spring which is situated over the drive shaft, one end of the spring being disposed in driving relation with said sleeve, another sleeve located over the end of the spring which is over the said part on the driven shaft, means connecting said last named sleeve and driven shaft in driving relation, said spring being adapted to contract and expand against the surfaces of said parts and said sleeves respectively, and means connecting the driven disk to the first mentioned sleeve.

6. In a clutch, the combination of a drive shaft, a driven shaft, clutch driving members, a driven clutch disk, means for actuating one of the driving members whereby the drive members may engage and release the driven disk, said shafts having juxtapositioned parts in axial alignment and of similar outside diameters, a coil spring located over said parts and normally out of engagement therewith, a sleeve over the portion of the spring which is situated over the drive shaft, one end of the spring being disposed in driving relation with said sleeve, said sleeve being rotatable relative to the driving shaft, another sleeve located over the end of the spring which is over the said part on the driven shaft, means connecting said last named sleeve and driven shaft in driving relation, said spring being adapted to contract and expand against the sufaces of said parts and said sleeves respectively, and means connecting the driven disk to the first mentioned sleeve.

7. In a clutch, the combination of clutch driving members, a clutch driven disk, the driving members being arranged for engaging and releasing the disk, a drive shaft, a driven shaft, said shafts having axially aligned parts of similar outside diameters disposed substantially at the center of rotation of the driven disk, a coil spring surrounding said parts, means connected to the driven shaft in driving relation therewith cooperating with the said part on the driven shaft to provide a circular recess housing the end of the spring over the said part on the driven shaft, the end of the spring over the driven shaft being connected in driving relation with the driven shaft, a sleeve member rotatable with respect to both shafts and cooperating with the said part on the drive shaft to form a circular recess housing the end of the spring over the said part on the drive shaft, and the last said end of the spring being connected in driving relation to the last mentioned sleeve, and means connecting the last mentioned sleeve to the driven disk.

ERNEST E. WEMP.